(12) United States Patent
Krishnaswamy et al.

(10) Patent No.: US 11,924,019 B2
(45) Date of Patent: Mar. 5, 2024

(54) ALARM MANAGEMENT MODULE FOR INTERNET-OF-THINGS (IoT) NETWORK

(71) Applicant: Jio Platforms Limited, Gujarat (IN)

(72) Inventors: Dilip Krishnaswamy, Karnataka (IN); Aayush Bhatnagar, Maharashtra (IN); Ankit Murarka, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/828,814

(22) Filed: May 31, 2022

(65) Prior Publication Data
US 2022/0385525 A1 Dec. 1, 2022

(30) Foreign Application Priority Data
May 31, 2021 (IN) .............................. 202121024284

(51) Int. Cl.
*H04L 41/06* (2022.01)
*H04L 67/12* (2022.01)

(52) U.S. Cl.
CPC .............. *H04L 41/06* (2013.01); *H04L 67/12* (2013.01)

(58) Field of Classification Search
CPC ...................................................... H04L 41/06
See application file for complete search history.

(56) References Cited

U.S. PATENT DOCUMENTS

| | | | | |
|---|---|---|---|---|
| 6,078,943 | A * | 6/2000 | Yu ........................... | G06F 9/505 718/105 |
| 9,170,951 | B1 * | 10/2015 | He ....................... | G06F 9/45533 |
| 2017/0134410 | A1 * | 5/2017 | Muddu .................. | G06N 5/022 |
| 2022/0360653 | A1 * | 11/2022 | Wouhaybi ............. | H04L 67/565 |

FOREIGN PATENT DOCUMENTS

EP        3119034 A1 *   1/2017   ......... H04L 41/0631

* cited by examiner

*Primary Examiner* — James E Springer
*Assistant Examiner* — Patrick F Ngankam
(74) *Attorney, Agent, or Firm* — Finnegan, Henderson, Farabow, Garrett & Dunner, LLP

(57) ABSTRACT

The present disclosure relates to a system comprising an alarm management module (AMM) that receives an alarm raised by an application running on a network function virtualization unit (NFVU) infrastructure, said NFVU infrastructure comprising a virtualization layer; and facilitates enrichment of the received alarm with NFVU infrastructure specific information based on a physical-and-virtual inventory associated with the NFVU infrastructure, said NFVU infrastructure specific information pertaining to hardware and virtual resources of the NFVU infrastructure that are involved in running said application. The AMM can further receive an infrastructure alarm pertaining to a hardware resource that forms part of the NFVU infrastructure, said infrastructure alarm being associated with a failure of or a potential functional error of the hardware resource; and facilitate enrichment of the received infrastructure alarm information with application information, said application information pertaining to at least one application that is impacted by the hardware resource.

18 Claims, 5 Drawing Sheets

ALARM MANAGEMENT MODULE FOR INTERNET-OF-THINGS (IoT) NETWORK

RESERVATION OF RIGHTS

A portion of the disclosure of this patent document contains material which is subject to intellectual property rights such as, but are not limited to, copyright, design, trademark, IC layout design, and/or trade dress protection, belonging to JIO Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 32.122, 32.125, 32.126, and the like.

TECHNICAL FIELD

The present disclosure relates to the field of alarm management. More particularly, the present disclosure relates to alarm management module/architecture in an Internet-of-Things (IoT) network.

BACKGROUND

Background description includes information that may be useful in understanding the present invention. It is not an admission that any of the information provided herein is prior art or relevant to the presently claimed invention, or that any publication specifically or implicitly referenced is prior art.

Internet of Things (IoT) extends Internet's infrastructure of interconnectedness to physical devices in a manner such that objects ranging from simple sensor devices, to household appliances, to vehicle systems, to industrial equipment, may communicate and interact with via a suite of known communication protocols.

FIG. 1 (prior art) illustrates an exemplary network environment for implementing an IoT system/architecture, wherein IoT devices 102 can be configured to communicate over one or more IoT networks 104. Although different IoT devices have been shown in the instant representation, they may individually or collectively be referred to as IoT device(s) 102 hereinafter, and three separate communication networks 104a, 104b, and 104c (which may be referred to individually or collectively as IoT network(s) 104 or IoT interface (s) 104) are shown in this example. It would be understood that this architecture is illustrative only, and any number of IoT devices 102 may communicate via any number of different IoT networks 104 in other embodiments. IoT network(s) 104 may correspond to peer-to-peer (P2P) networks formed among the various IoT devices 102. Such networks may be wired or wireless, and may use any combination of known network protocols and technologies, including IP-based networks (e.g., Wi-Fi, IEEE 802.11), RF networks, Bluetooth networks, cellular networks, NFC-based communications, etc. In some examples, IoT network(s) 104 may be based on short-range wireless technologies, and thus IoT devices 102 may discover and communicate with other IoT devices 102 that are within close proximity of each other.

Alarm management is a core function in an Internet-of-Things (IoT) network as such a network that comprises multiple sensors/actuators that communicatively interact/couple with each other over the network to perform one or more functions such as detection, processing, and prediction of one or more events such as industrial operations. Alarm management can help optimize alarm system performance to improve, for instance, plant safety, productivity and profitability along with notifying of abnormal conditions, events, or equipment malfunctions of a particular process or situation. Alarm management can help stakeholders and users to effectively manage the production process, wherein by collecting and storing alarms and operational events, identifying and eliminating noise, efficient alarm management can help eliminate nuisance alarms and allow stakeholders to identify and respond to process issues before they turn into critical problems.

With industrial IoT, automation, and robotics playing a critical role in Industry 4.0 by configuring a network of devices, machinery, and sensors that are connected to each other and to the Internet with the purpose of collecting data and analyzing it to apply this information in continuous process improvement, it is imperative that alarm management function be optimally configured and managed so as to ensure that there is seamless and real-time automated and remote equipment management and monitoring, predictive maintenance, faster implementation of improvements, optimal inventory management, accurate quality control, supply chain optimization, and plant safety improvement.

SUMMARY

The present disclosure relates to a system that can include an alarm management module (AMM) coupled with a processor, wherein the processor can cause the AMM to: receive an alarm raised by an application running on a network function virtualization unit (NFVU) infrastructure, said NFVU infrastructure include a virtualization layer; facilitate enrichment of the received alarm with NFVU infrastructure specific information based on a physical-and-virtual inventory associated with the NFVU infrastructure, said NFVU infrastructure specific information pertaining to hardware and virtual resources of the NFVU infrastructure that are involved in running said application; and transmit the enriched alarm information.

The processor can further cause the AMM to: receive an infrastructure alarm pertaining to a hardware resource that forms part of the NFVU, said infrastructure alarm being associated with a failure of or a potential functional error of the hardware resource; and facilitate enrichment of the received infrastructure alarm information with application information, said application information pertaining to at least one application that is impacted by the hardware resource. In an aspect, the infrastructure alarm can pertain to at least one of a hardware connectivity issue, hardware failure, network connectivity issue/failure, power issue, cooling issue, and a physical device functional error.

In another aspect, the virtualization layer can virtualize hardware resources to form virtual resources, wherein the virtual resources can include at least one of a virtual computing unit, virtual storage unit, and a virtual network unit.

In another aspect, the system can include a virtualized infrastructure manager (VIM) to manage the NFVU.

In another aspect, the AMM can receive the alarm through a load balancer, wherein the load balancer can be coupled with an alarm dictionary, based on which, from a directory of alarms, the load balancer can identify attributes associated with the received alarm, and accordingly load balance the alarm notifications sent to the AMM.

In another aspect, the AMM can be operatively coupled with a selection module that indicates whether to undertake real-time enrichment through a RT enrichment module or to undertake near-real-time enrichment through an offline enrichment module.

The AMM can be operatively coupled with an alarm correlation learning and prediction engine that correlates relationships between a plurality of alarms to identify one or more actionable alarms owing to which the plurality of alarms were raised or are resolvable. The alarm correlation learning and prediction engine, over a period of time, can further be configured to learn performance threshold ranges for a plurality of hardware resources that form part of the NFVU infrastructure, and predict when the ranges are expected to exceed, at which time instance, alarms can be automatically raised by the NFVU infrastructure.

The present disclosure further includes one or more element management systems (EMSs) that may be configured between the NFVU infrastructure and the AMM such that application alarm is generated by the EMS, and infrastructure alarm is generated by the NFVU infrastructure. In another aspect, the EMSs may be operatively coupled with corresponding virtualization of a network function (VNF) elements.

The present disclosure further includes one or more element management systems (EMSs) that may be configured between a hardware resource infrastructure and the AMM such that application alarm is generated by the EMS, and infrastructure alarm is generated by the hardware resource infrastructure. In another aspect, the EMSs may be operatively coupled with corresponding platform network function (PNF) elements.

The present disclosure further relates to a method comprising: receiving, at an alarm management module (AMM), an alarm raised by an application running on a network function virtualization unit (NFVU) infrastructure, said NFVU infrastructure comprising a virtualization layer; facilitating enrichment of the received alarm with NFVU infrastructure specific information based on a physical-and-virtual inventory associated with the NFVU infrastructure, said NFVU infrastructure specific information pertaining to hardware and virtual resources of the NFVU infrastructure that are involved in running said application; and transmitting the enriched alarm information.

The proposed method can further include the step of receiving an infrastructure alarm pertaining to a hardware resource that forms part of the NFVU, said infrastructure alarm being associated with a failure of or a potential functional error of the hardware resource; and facilitating enrichment of the received infrastructure alarm information with application information, said application information pertaining to at least one application that is impacted by the hardware resource.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
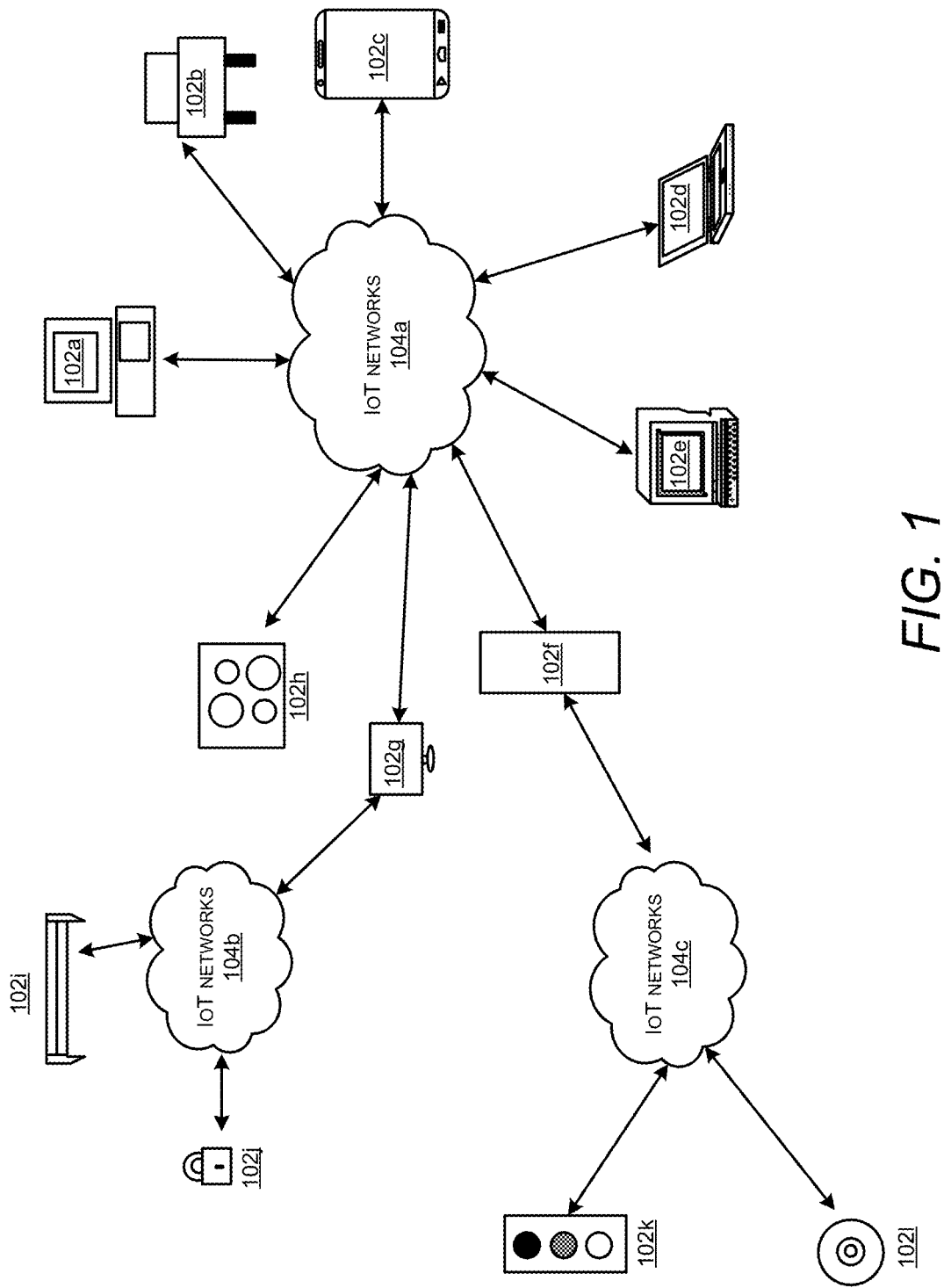
FIG. 1 (prior art) illustrates an exemplary network environment for implementing an IoT system/architecture.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

The present disclosure relates to the field of alarm management. More particularly, the present disclosure relates to alarm management module/architecture in an Internet-of-Things (IoT) network.

The present disclosure relates to a system that can include an alarm management module (AMM) coupled with a processor, wherein the processor can cause the AMM to: receive an alarm raised by an application running on a network function virtualization unit (NFVU) infrastructure, said NFVU infrastructure include a virtualization layer; facilitate enrichment of the received alarm with NFVU infrastructure specific information based on a physical-and-virtual inventory associated with the NFVU infrastructure, said NFVU infrastructure specific information pertaining to hardware and virtual resources of the NFVU infrastructure that are involved in running said application; and transmit the enriched alarm information.

The processor can further cause the AMM to: receive an infrastructure alarm pertaining to a hardware resource that forms part of the NFVU, said infrastructure alarm being associated with a failure of or a potential functional error of the hardware resource; and facilitate enrichment of the received infrastructure alarm information with application information, said application information pertaining to at least one application that is impacted by the hardware resource. In an aspect, the infrastructure alarm can pertain to at least one of a hardware connectivity issue, hardware failure, network connectivity issue/failure, power issue, cooling issue, and a physical device functional error.

In another aspect, the virtualization layer can virtualize hardware resources to form virtual resources, wherein the virtual resources can include at least one of a virtual computing unit, virtual storage unit, and a virtual network unit.

In another aspect, the system can include a virtualized infrastructure manager (VIM) to manage the NFVU.

In another aspect, the AMM can receive the alarm through a load balancer, wherein the load balancer can be coupled with an alarm dictionary, based on which, from a directory of alarms, the load balancer can identify attributes associated with the received alarm, and accordingly load balance the alarm notifications sent to the AMM.

In another aspect, the AMM can be operatively coupled with a selection module that indicates whether to undertake real-time enrichment through a RT enrichment module or to undertake near-real-time enrichment through an offline enrichment module.

The AMM can be operatively coupled with an alarm correlation learning and prediction engine that correlates relationships between a plurality of alarms to identify one or more actionable alarms owing to which the plurality of alarms were raised or are resolvable. The alarm correlation learning and prediction engine, over a period of time, can further be configured to learn performance threshold ranges for a plurality of hardware resources that form part of the NFVU infrastructure, and predict when the ranges are expected to exceed, at which time instance, alarms can be automatically raised by the NFVU infrastructure.

The present disclosure further includes one or more element management systems (EMSs) that may be configured between the NFVU infrastructure and the AMM such that application alarm is generated by the EMS, and infrastructure alarm is generated by the NFVU infrastructure. In another aspect, the EMSs may be operatively coupled with corresponding virtualization of a network function (VNF) elements.

The present disclosure further includes one or more element management systems (EMSs) that may be configured between a hardware resource infrastructure and the AMM such that application alarm is generated by the EMS, and infrastructure alarm is generated by the hardware resource infrastructure. In another aspect, the EMSs may be operatively coupled with corresponding platform network function (PNF) elements.

The present disclosure further relates to a method comprising: receiving, at an alarm management module (AMM), an alarm raised by an application running on a network function virtualization unit (NFVU) infrastructure, said NFVU infrastructure comprising a virtualization layer; facilitating enrichment of the received alarm with NFVU infrastructure specific information based on a physical-and-virtual inventory associated with the NFVU infrastructure, said NFVU infrastructure specific information pertaining to hardware and virtual resources of the NFVU infrastructure that are involved in running said application; and transmitting the enriched alarm information.

The proposed method can further include the step of receiving an infrastructure alarm pertaining to a hardware resource that forms part of the NFVU, said infrastructure alarm being associated with a failure of or a potential functional error of the hardware resource; and facilitating enrichment of the received infrastructure alarm information with application information, said application information pertaining to at least one application that is impacted by the hardware resource.

Figure 2:
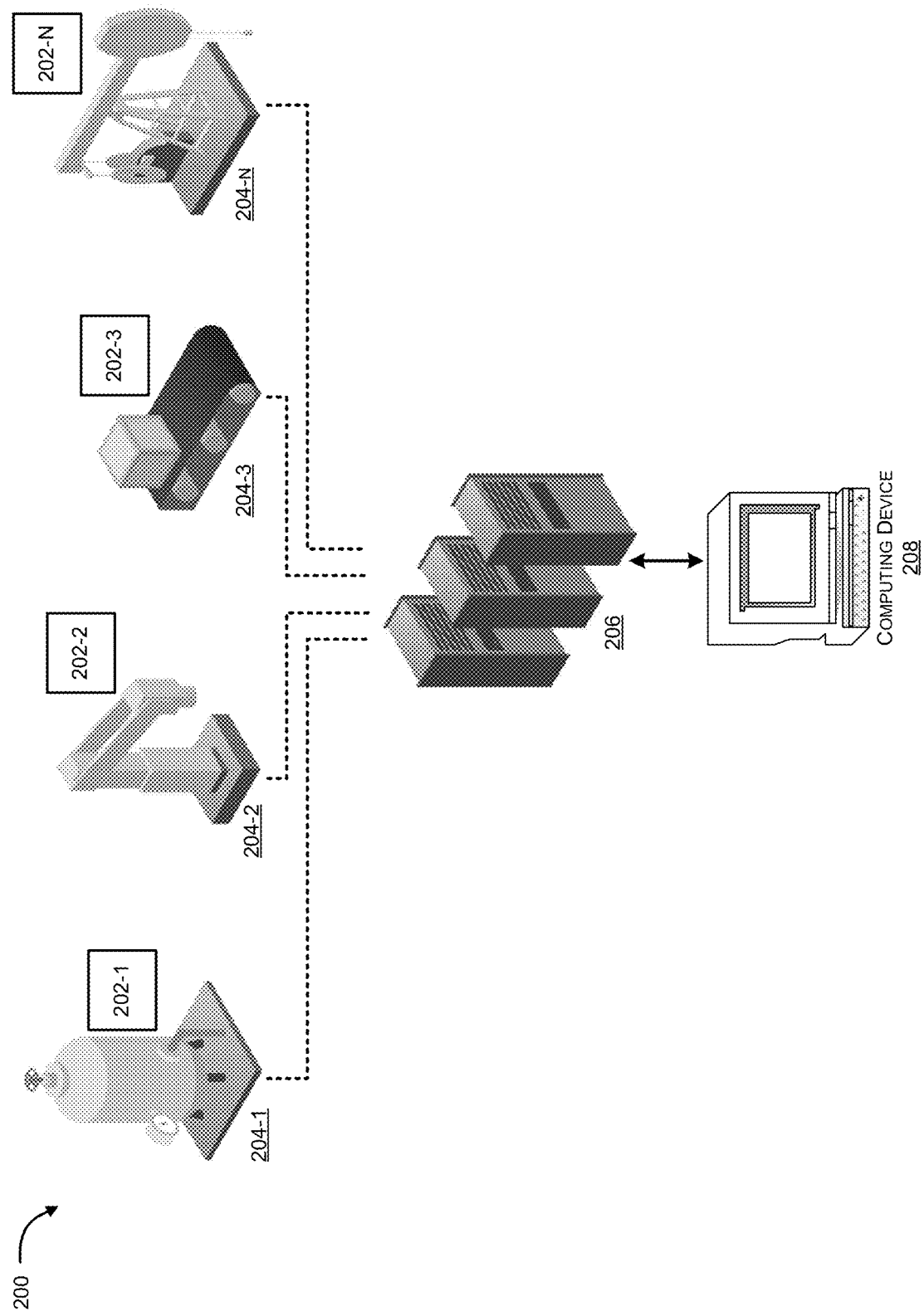
FIG. 2 illustrates an exemplary alarm management architecture that forms part of an IoT network, in accordance with an embodiment of the present disclosure.

FIG. 2 illustrates an exemplary alarm management architecture 200 that forms part of an IoT network, in accordance with an embodiment of the present disclosure. As can be seen, one or more sensors 202-1, 202-2, 202-3, . . . , 202-N can be operatively and respectively coupled with industrial equipment's 204-1, 204-2, and 204-3, . . . , 204-N in a manner such that upon detection of a failure or notification of preventive maintenance or any other pre-configured alarm/notification signal, said communication can be sent securely to an alarm application server 206, which can process the received signal, and accordingly deliver real-time notifications to a computing device 208. Such notification can be a failure notification or any other transmission indicative of the action that the user/operator needs to undertake. In exemplary aspect, such alarm notifications can pertain to any or a combination of, for example, triggers from environmental sensors (that track temperature, pressure, humidity, for instance), power updates, heartbeat notifications, operational notifications, network connectivity triggers, among others.

Figure 3:
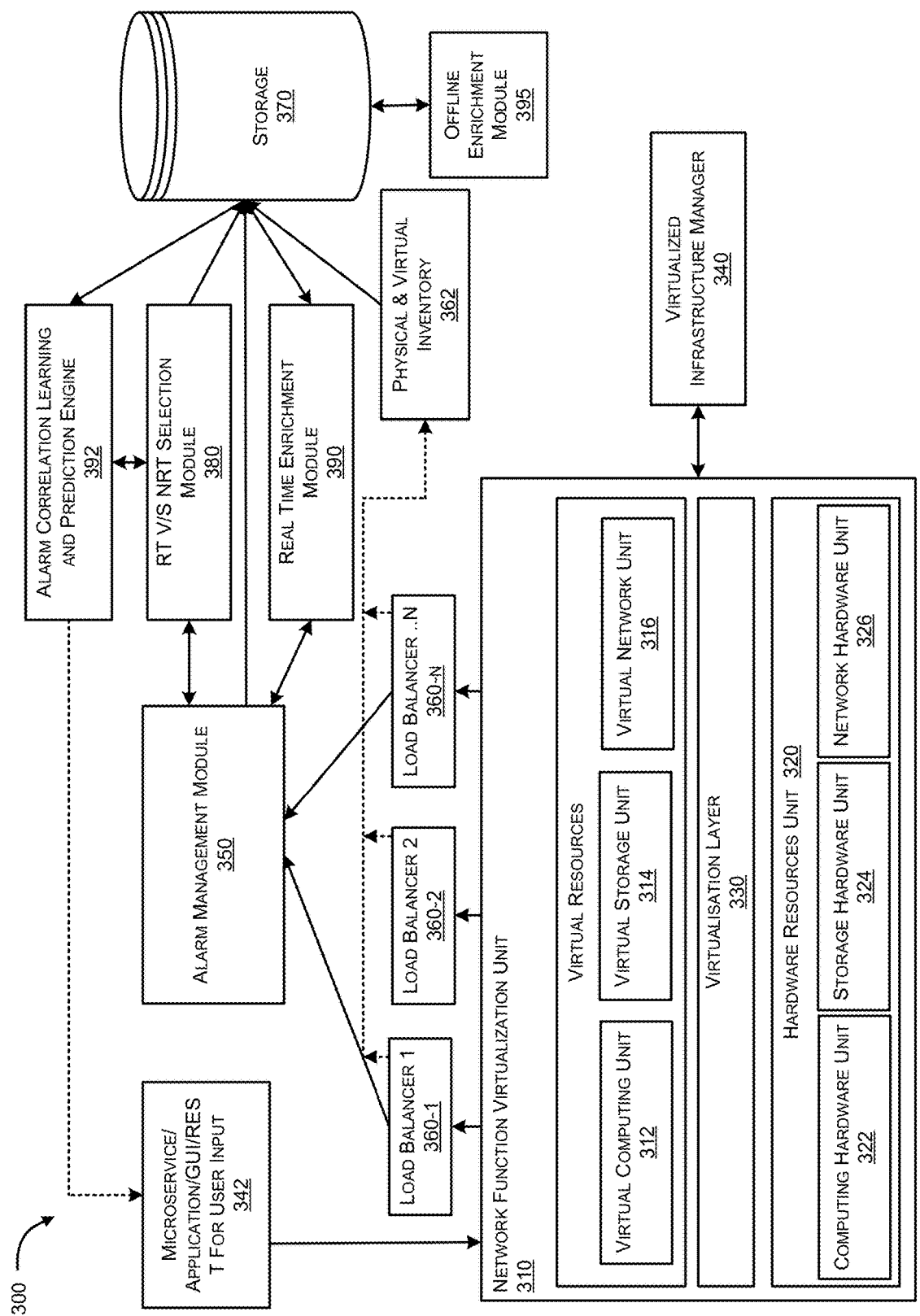
FIG. 3 illustrates an exemplary block diagram representing an architecture/system, having the proposed hardware alarm based alarm management module (AMM), in accordance with an embodiment of the present disclosure.

FIG. 3 illustrates an exemplary block diagram representing an architecture/system 300, having the proposed hardware based alarm management module (AMM) 350, in accordance with an embodiment of the present disclosure. The proposed architecture 300 can be configured to include an alarm management module 350 that can receive/process inputs from one or more operatively coupled modules, and control/manage alarms in the IoT network based on such processed inputs. In an aspect, apart from alarm management, module 350 of the present disclosure can further be configured to undertake fault localization and any other associate operation and therefore scope of the module 350, 450, and 550 is suitably to be reviewed. For instance, the module 350, 450, and 550 can further be configured to auto-generate work order notifications, configure monitoring including filtering and reactive measures, design fault-proof work flows, create a closed-loop system, and add predictive analytics.

In an exemplary aspect, the virtualization layer (VL) 330 can be configured to virtualize physical/hardware resources (322, 324, 326) so as to form virtual resources such as the virtual computing unit 312, virtual storage unit 314, and the virtual network unit 316, making the physical hardware resources abstract. VIM 340 can be configured to manage the complete NFVU 310 and has complete knowledge of the hardware resources, VL 330 along with the virtual resources and available and in-use capabilities. In an exemplary implementation, one or more applications/microservices 342 running on the NFVU 310 can generate a plurality of alarms, for instance indicative of errors/notifications in/from a database, which can be sent to a load balancer 360. Load balancer(s) 360 can be communicatively coupled with an alarm dictionary/directory, based on which, from an exhaustive list of alarms, the load balancer(s) can identify the nature/type/attributes of the alarm and balance the alarm notifications to be transmitted to the AMM 350 accordingly. Such alarms can, not only be raised by the applications and/or the microservices, but even from the infrastructure or components thereof such as the servers, databases, computing devices, among other components that form part of the overall environment (including forming part of the NFVU 310) and are, for instance, indicative of hardware/network/power/cooling/connectivity failure. The proposed technical solution therefore is able to, in case of a server power or fan failure issue, not only raises an alarm notifying the error/failure and sends the same to AMM 350 through the load balancer 360, but is also able to evaluate, in real-time, the applications/microservices that would be impacted by the said server's fan issue. Such assessment is done based on information provided by the offline enrichment module 395 to the storage 370, and using the physical and virtual inventory 362 that retains a mapping between the virtual and physical resources along with which applications/microservices are running on which resources. Therefore, as part of the proposed system, in case of an application/microservice level alarm, it can be enriched by a infrastructure/architecture level alarm in real-time (RT) or near real-time (NRT) basis.

In an exemplary aspect, when the AMM 350 receives an alarm from the infrastructure (interchangeably referred to as NFVU 310), the AMM 350, based on an input from the RT (Real-Time) vs NRT (Near/Non Real-Time) selection module 380, decides whether to enrich the alarm in RT or in NRT, wherein the inventory 362 is used to enrich the alarm information such that if RT enrichment is selected, alarm information is enriched based on the RT enrichment module 390, else otherwise based on the offline enrichment module 395. In an exemplary implementation, the proposed system/environment (including the AMM) is able to, upon being notified by an alarm that has been generated by the infrastructure 310, enrich the alarm with application/microservice information that runs on the specific hardware component that has triggered the alarm. For instance, if Server 4's fan has stopped working, an alarm from the infrastructure 310 can enable the alarm information to be enriched by the RT enrichment module 390 in a manner such that information pertaining to which applications/microservices are running on the said server 4 are also associated/added/enriched into the alarm information and then displayed to the user. Similarly, when the system receives an application/microservice alarm, AMM 350 can enrich the alarm information with information associated to the infrastructure components/elements (i.e. any or a combination of server, rack, data centre location, or building that the associated/responsible hardware is positioned in) that are impacting/getting impacted by the application/microservice in context and the specifics of the alarm. Post the alarm enrichment, the alarm information is therefore displayed to the user. Post the alarm information being enriched, the system can also enable automatic self-healing i.e. the failure can be automatically diagnosed and the rectification measure can be undertaken automatically, say by moving the affected application from one server to another or spinning a new VM (virtual machine or container) instantly without any manual intervention. Using this enriched information, the system enables proactive steps to be taken such that the infrastructure elements can be modified or the VL 330 can be configured so that the application/microservice running over it does not get impacted in terms of its performance attributes or that the impact is minimal.

In yet another aspect, alarm correlation learning and prediction engine 392 can be configured to correlate different alarms to be able to, for instance, deduce one or more actionable alarms. For instance, in case multiple alarms are generated by different applications/microservices, and post alarm information enrichment, it is identified that they are all impacted due to the power supply of server 3 going down, then the actionable alarm would be the one generated by the server 3 instead of the ones generated by the impacted applications/microservices per se. The correlation between the alarms by engine 392 therefore assists in understanding the relationships between the different alarms and only act on such one or more alarms that are the root cause of the issue at hand. Prediction aspect of the engine 392 can be configured to predict, based on the capabilities/thresholds of the underlying hardware that the engine 392, through machine learning, has learnt over a period of time, which applications/microservices to be run on which part of the infrastructure and also predict the ranges (say 5-25% CPU usage) in which the different elements of the infrastructure 310 function. Such capabilities include but are not limited to RAM, memory, consumption information, storage, disk usage, network bandwidth, Rx/Tx, processing capability, among other parameters of the different servers/memory devices/computing devices/units that form part of the hardware resources unit 320. The proposed system can further be configured to, based on the predicted value ranges of the different components of the infrastructure, raise infrastructure alarm(s) once the ranges are exceeded (say if the CPU usage becomes 30%) or is about to exceed (say is around 22%) to that precautionary alarms/actions can be taken and responsible users are timely notified even before a failure takes place per se.

The instant invention therefore is able to move beyond alarms that are triggered merely based on performance attributes of the applications/microservices that are running on the infrastructure 310 but also ensure that even if there is an issue pertaining to the infrastructure 310 or components/underlying hardware that form part thereof, appropriate alarms are triggered and enriched based on RT or NRT enrichment modules.

In an exemplary aspect, system of the present disclosure can be configured to implement virtualization of a network function (VNF) in a legacy network. Examples of such network functions for virtualization can include, but are not limited to, 3GPP Evolved Packet Core network elements, e.g. Mobility Management Entity (MME), Serving Gateway (SGW), Packet Data Network Gateway (PDN); elements in a home network, e.g. Residential Gateway (RGW); and conventional network functions, e.g. Dynamic Host Configuration Protocol (DHP) servers, firewalls, etc. The instant patent specification includes systems and methods as defined in 3GPP Technical Specification (TS) 32.122, 32.125, 32.126, and the like. It should be noted that a VNF can be deployed over multiple virtual machines (VMs), where each VM can host a single component of the VNF, or, the whole VNF can be deployed in a single VM as well. Furthermore, a container could be used, instead of a VM, to run a VNF. Such virtualization can be implemented through network function visualization unit (NFVI) 310 that can be can be used to run the virtualized software implementations of telecommunication applications, and can include a hardware resources unit 320 and virtualized resources (such as virtual computing unit 312, virtual storage unit 314, and a virtual network unit 316) and a virtualization layer 330 (such as a hypervisor).

In an exemplary implementation, the hardware resources unit 320 can include any or a combination of a computing hardware unit 322, a storage hardware unit 324, and a network hardware unit 326. In an exemplary implementation, the hardware resources unit 320, the virtualization layer 330, and the NFVI unit 310 can be operatively coupled to a Virtualized Infrastructure Manager (VIM) unit 340, wherein the visualization performed by the NFVI 310 may be controlled and/or managed by the VIM unit 340 based on a set of pre-defined instructions.

As mentioned above, the hardware resources unit 320 can include computing 322, storage 324, and network 326 resources that can provide processing, storage and connectivity to VNFs through the virtualization layer 330, such as a hypervisor. The virtualization layer 330 can be responsible for abstracting and logically partitioning physical resources, enabling the software that implements the VNF to use the underlying virtualized infrastructure and providing virtualized resources to the VNF so that the VNF can be executed. Also, the virtualization layer 330 can be configured to ensure that VNFs are decoupled from hardware resources 320 and therefore, the software can be deployed on different physical hardware resources.

In an exemplary aspect, NFVI unit 310 can be configured to receive user inputs 342 through any or a combination of a microservice, an application, a graphical user interface, a reset request, among other like platforms/mechanisms that form part of the IoT network, based on which the NFVI 310 can, post processing, transmit a set of data packets/signals, through a plurality of load balancers 360-1, 360-2, . . . , 360-N (collectively referred to as 350 hereinafter) to the AMM 350. As used herein, the term 'load balancer' may be defined as a type of virtual hardware unit which may be configured to distribute a set of tasks over a set of resources. In one embodiment, load balancer 360 may be configured to transmit the visualized data to the AMM 350 to initiate management of the alarm function. In an exemplary aspect, the load balancers 350 can be operatively coupled with a physical and virtual inventory 362, which in turn is communicatively coupled with a storage unit/device 370.

In an example implementation, the storage unit 370 can be communicatively coupled with the AMM 350 such that the alarm management operations can be stored/logged along with timestamp and alarm parameters such as IoT network/component responsible for the alarm, type of alarm, severity of alarm, action taken post alarm, timestamps associated with such actions, among other like alarm attributes generated/processed by the AMM 350 in real-time. Storage unit 370 can further be enriched with event-based alarm information through one or more offline units such as offline enrichment module 395. AMM 350 can further be operatively coupled with a real-time enrichment module 390, and a Real-Time (RT) vs Near-Real-Time (NRT) selection module 380 that facilitates generation/transmission and receipt of alarm information/signals in RT or NRT depending on the context and situation. Based on the number of false triggers and/or alarm information generated by AMM 350 in real-time, alarm correlation information can be sent and synchronized between the selection module 380 and an alarm correlation learning and prediction engine 390, which in turn gives the same as feedback/input to the user input trigger unit 340. In an exemplary implementation, the term 'alarm correlation' may be defined as a method of combining multiple alarm notifications into a single notification to reduce an alarm flood. In one embodiment, the alarm correlation learning and prediction engine 380 may be created using any or a combination of an Artificial Intelligence (AI) and Machine Learning (ML) technique, to identify a priority for a corresponding one or more alarms which may be generated within the system 300. The engine 380 may rate the priority or the one or more alarm notifications based on a set of rules, a set of instructions which may be pre-defined.

In one exemplary embodiment, the engine 390 may use a transitive alarm correlation technique to determine a weightage of the one or more alarm notification generated within the system. According to the transitive alarm correlation, an alarm notification 'A' may be related to an alarm notification Bi, wherein, Bi may include multiple notifications such as B1, B2, B3 . . . Bi, where 'i' is any integer value. Further, if the alarm notification Bi is related to the notification Cij, where, 'i' and 'j' are any integer values, then alarm notification 'A' can be related to the alarm notification Cij. In one specific embodiment, to achieve the transitive alarm correlation, a Bayesian conditional probability estimate technique may be applied. As used herein, the term 'Bayesian conditional probability' may be defined as a technique used to compute conditional probability using the machine learning models. In one embodiment, the Bayesian conditional probability technique may be applied on the visualized data received by the learning and prediction engine 390 to generate the alarm notifications.

In one exemplary embodiment, a technique of alarm consolidation technique may be applied on the one or more alarms generated by the system 300 in order to obtain a single alarm notification inclusive of all multiple alarms. More specifically, multiple alarm notifications may be generated within the system 300, where two or more such notifications may be related to a same issue occurred within the system. Subsequently, in order to eliminate such repeated notifications and to reduce redundant processing of the alarm notifications, the alarm consolidation technique may be used.

In an exemplary implementation, AMM function within the alarm system can be configured so as to notify operators of abnormal process conditions or equipment malfunctions and support the response. The alarm systems can include both the basic process control system (BPCS) and the safety instrumented system (SIS), each of which uses measurements of process conditions and logic to generate alarms. The alarm system can also include a mechanism for communicating the alarm information to the operator via an HMI, usually a computer screen or an annunciator panel. Additional functions of the alarm system are an alarm and event log, an alarm historian, and the generation of performance metrics for the alarm system. There are external systems that can use the data from the alarm system. AMM of the present disclosure can further be configured to, based on inputs from the network architecture/NFVI, real-time enrichment module, and selection module, monitor, assess and audit alarms to ensure continuous monitoring, periodic performance assessment, and recurring audit of the alarm system in order to properly manage the identification, rationalization, detailed design, implementation, operations, maintenance, monitoring and assessment, management of change, and audit life cycle work processes.

Figure 4:
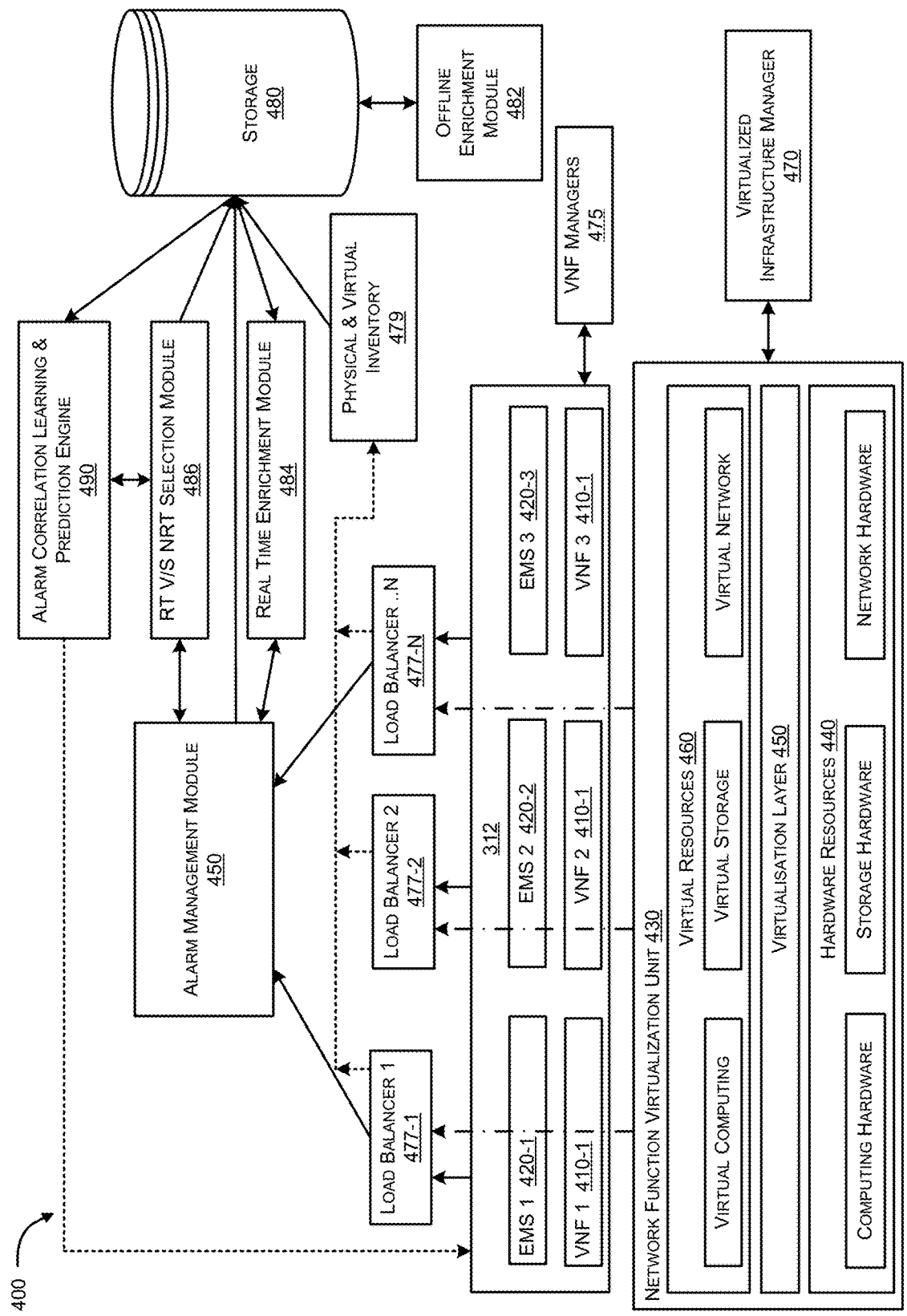
FIG. 4 illustrates an exemplary block diagram representing an architecture/system having the proposed virtualized software based alarm management module (AMM), in accordance with an embodiment of the present disclosure.

FIG. 4 illustrates an exemplary block diagram representing an architecture/system 400, having the proposed virtualized software based alarm management module (AMM) 450, in accordance with an embodiment of the present disclosure. The proposed architecture 400 can be configured to include an alarm management module (AMM) 450 that can receive/process inputs from one or more operatively coupled modules, and control/manage alarms in the IoT network based on such processed inputs.

In an exemplary aspect, system of the present disclosure can be configured to implement Network Function Virtualization (NFV) which is a network architecture that can be configured to utilize the IoT network to virtualize entire network node functions onto industry standard high volume servers, switches and storage that can be located in Data centers or centralized locations. NFV can be configured to incorporate implementation of network functions in a software that can run on a range of industry standard server hardware, and that can be moved to, or instantiated in, various locations in the network as in when required, without the need to install new hardware equipment.

Aspects of the proposed NFV architecture can include a virtualization network function (VNF) layer that can include two subsections Virtual Network Function (VNF) 410 and Element Management System (EMS) 420. A Virtual Network Function (VNF) 410 is a fundamental block in NFV architecture and can enable virtualization of one or more network elements such as switches, routers, network controllers among others e.g. when a router is virtualized, it is referred to as Router VNF, and similarly when a base station is virtualized, it is referred to as a base station VNF, and likewise there can be DHCP server VNF and Firewall VNF. Even when one sub-function of a network element is virtualized, it is called VNF. For example in Evolved Packet Corer case, various sub-functions like MME, Gateways, and HSS can be separate VNFs which together function as virtual EPC. In an exemplary aspect, VNFs can be deployed on Virtual Machines (VMs). A VNF can be deployed on multiple VMs, where each VM can be configured to host a single function of VNF. However, the whole VNF can also be deployed be on a single VM as well. Element Management System (EMS) 420 can be made responsible for the functional management of VNF. The management functions can include Fault, Configuration, Accounting, Performance and Security Management. An EMS may manage the VNFs through proprietary interfaces. There may be one EMS per VNF or one EMS that can manage multiple VNFs. EMS itself can be deployed as Virtual Network Function (VNF).

In an exemplary aspect, NFV architecture can further include a NFVI layer 430 having similar construction/function as for the hardware-based alarm management system 300 explained above. NFVI layer 430 represents hardware and software components that build up the environment in which VNFs are deployed, managed and executed. NFV infrastructure physically can span across several locations, wherein the network provides connectivity between these locations to be part of NFV infrastructure. In an exemplary implementation, as explained above, NFV Infrastructure can include hardware resources 440 (having computing hardware, storage hardware, and network hardware), a virtualization layer 450, and virtual resources 460 (virtual computing, virtual storage, and virtual network). Virtualization layer 450 and hardware resources 440 can be configured as a single entity providing the architecture the desired resources. Hardware resources 440 can include computing, storage and the network can be configured to provide processing, storage and connectivity to VNFs through virtualization (hypervisor) layer. Computing and storage resources can be commonly used in a pool. The network resource can include switching functions e.g. router, wired or wireless network. Virtualization Layer also known as a hypervisor can abstract the hardware resources and decouple the VNF software from the underlying hardware to ensure a hardware independent life cycle for VNFs. Virtualization Layer 450 can facilitate in abstracting and logically partitioning physical resources, commonly as hardware abstraction layer, enabling the software to implement the VNF to use the underlying Virtualization Infrastructure, and providing the virtualised resources to VNF, so that latter can be executed. The virtualization layer in middle can help ensure that the VNFs are decoupled from hardware resource and therefore software can be deployed on different physical resources.

System of the present disclosure can further include a Virtualised Infrastructure Manager (VIM) 470 that can include functionalities that are used to control and manage the interaction of a VNF with computing, storage and network resources under its authority, as well as their virtualisation. VIM 470 can be configured to manage/control inventory of software, computing, storage and network resources dedicated to NFV infrastructure, infrastructure resource and allocation e.g. increasing the VMs, increasing energy efficiency etc, allocation of VMs on hypervisors, compute resources, storage, and relevant network connectivity, perform root cause analysis of performance issues from the NFV infrastructure perspective, collect infrastructure fault information, and collect information for capacity planning, monitoring, and optimization.

System of the present disclosure can further include VNF Manager 475 that can be configured to manage VNF life cycle that includes, but is not limited to, installation, updates, query, scale up/down and termination. VNF manager 475 may be deployed for each VNF or a single VNF manager may be deployed to serve multiple VNFs.

In an exemplary aspect, NFVI unit 450 can be configured to receive feedback/control input/signal from alarm correlation learning and prediction engine 490 that forms part of the IoT network and is communicatively coupled with one or more sensors/actuators/industrial devices (or components thereof), based on which the NFVI 450 can, post processing, transmit a set of data packets/signals, through a plurality of load balancers 477-1, 477-2, . . . , 477-N (collectively referred to as 477 hereinafter) to the AMM 450. As used herein, the term 'load balancer' may be defined as a type of virtual hardware unit which may be configured to distribute a set of tasks over a set of resources. In one embodiment, the first load balancer 477 may be configured to transmit the visualized data to the AMM 450 to initiate management of the alarm function. In an exemplary aspect, the load balancers 477 can be operatively coupled with a physical and virtual inventory 479, which in turn is communicatively coupled with a storage unit/device 480.

In an example implementation, the storage unit 480 can be communicatively coupled with the AMM 450 such that the alarm management operations can be stored/logged along with timestamp and alarm parameters such as IoT network/component responsible for the alarm, type of alarm, severity of alarm, action taken post alarm, timestamps associated with such actions, among other like alarm attributes generated/processed by the AMM 450 in real-time. Storage unit 480 can further be enriched with event-based alarm information through one or more offline units such as offline enrichment module 482. AMM 450 can further be operatively coupled with a real-time enrichment module 484, and a Real-Time (RT) vs Near-Real-Time (NRT) selection module 486 that facilitates generation/transmission and receipt of alarm information/signals in RT or NRT depending on the context and situation. Based on the number of false triggers and/or alarm information generated by AMM 450 in real-time, alarm correlation information can be sent and synchronized between the selection module 486 and an alarm correlation learning and prediction engine 490. In an exemplary implementation, the term 'alarm correlation' may be defined as a method of combining multiple alarm notifications into a single notification to reduce an alarm flood. In one embodiment, the alarm correlation learning and prediction engine 490 may be created using any or a combination of an Artificial Intelligence (AI) and Machine Learning (ML) technique, to identify a priority for a corresponding one or more alarms which may be generated within the system 400. The engine 490 may rate the priority or the one or more alarm notifications based on a set of rules, a set of instructions which may be pre-defined.

In an exemplary aspect, FIG. 4 is an extension of FIG. 3, wherein an element management system (EMS) 420 is configured between the virtualization infrastructure 430 and the load balancer(s) 477 such that the application/microservice level alarms are generated by the EMS 420 and the virtualized/containerized (cloud native and virtual machines) infrastructure alarm would be generated by the infrastructure/NFVU 430.

Figure 5:
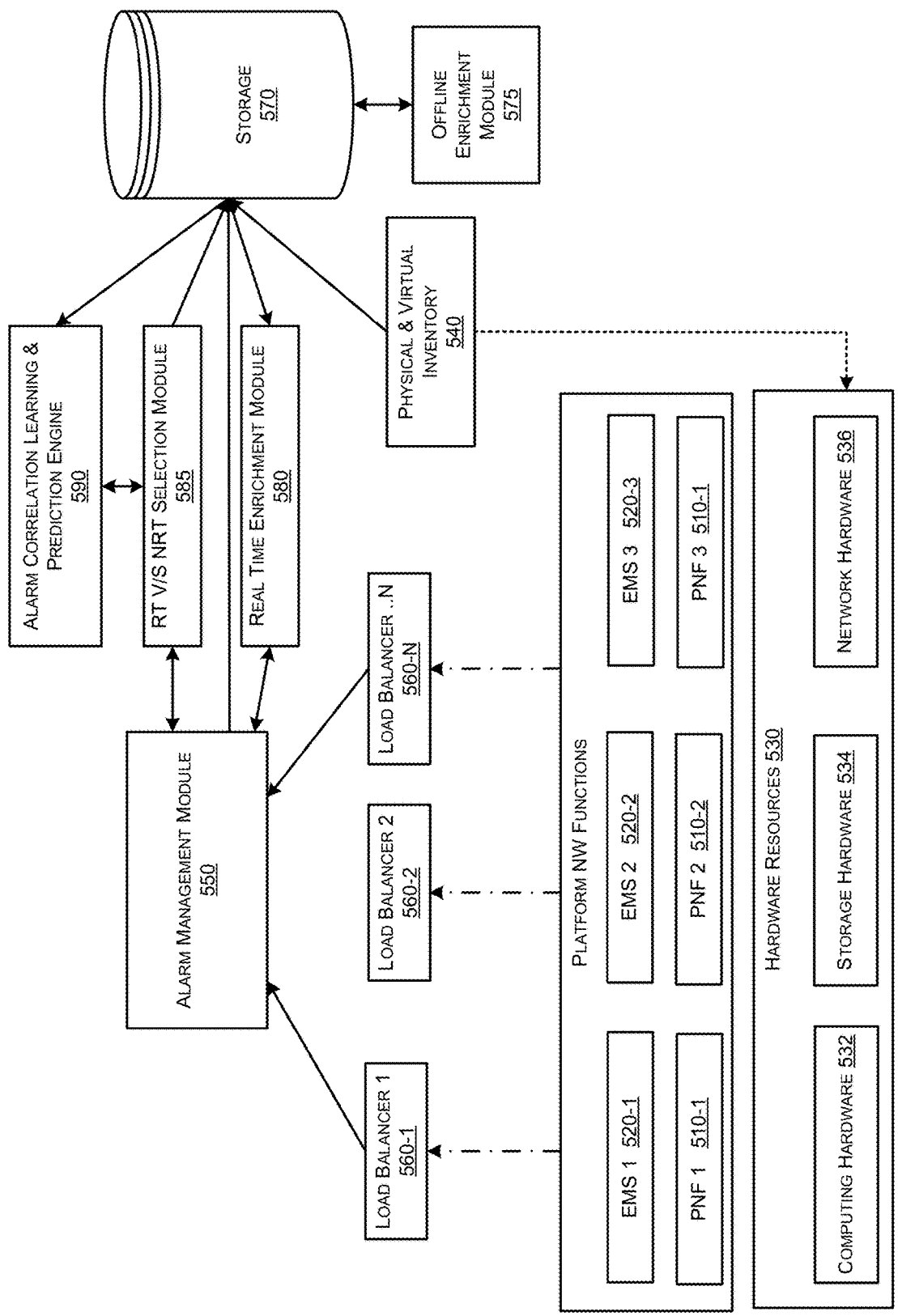
FIG. 5 illustrates an exemplary block diagram representing an architecture/system having the proposed platform network function (PNF) software based alarm management module (AMM), in accordance with an embodiment of the present disclosure.

FIG. 5 illustrates an exemplary block diagram representing an architecture/system 500 having the proposed platform network function (PNF) software based alarm management module (AMM) 550, in accordance with an embodiment of the present disclosure.

The proposed architecture 500 can be configured to include an alarm management module (AMM) 550 that can receive/process inputs from one or more operatively coupled modules, and control/manage alarms in the IoT network based on such processed inputs.

In an exemplary aspect, system of the present disclosure can be configured to implement a network architecture that can be configured to utilize the IoT network to virtualize entire network node functions. Aspects of the proposed network architecture can include a platform network function (PNF) layer that can include two subsections Platform/Physical Network Function (PNF) 510 and Element Management System (EMS) 520. A PNF 510 can be configured as a Network Function(s) that is implemented using a set of software modules deployed on a dedicated hardware element while VNFs utilize cloud resources to provide Network Functions through virtualized software modules. PNFs can be configured to be chained/operatively coupled with VNFs to design and deploy more complex end to end services that span across Network Clouds. PNF can be configured to provide one or more network functions on a dedicated hardware box in order to provide the desired Network Functions. Element Management System (EMS) 520 can be made responsible for the functional management of PNF.

In an exemplary aspect, the proposed network architecture can further include hardware resources unit/layer 530 (having computing hardware 532, storage hardware 534, and network hardware 536), wherein the hardware resources unit/layer 530 can be configured to receive feedback/control input/signal from physical and virtual inventory 540 that is in turn operatively coupled with the storage unit 570. In an exemplary implementation, physical and virtual inventory 540 can be configured to transmit alarm/alert information that forms part of the IoT network and is communicatively coupled with one or more sensors/actuators/industrial devices (or components thereof), based on which the hardware resources unit/layer 530 can, post processing along with the proposed network architecture, transmit a set of data packets/signals, through a plurality of load balancers 560-1, 560-2, . . . , 560-N (collectively referred to as 560 hereinafter) to the AMM 550. As used herein, the term 'load balancer' may be defined as a type of virtual hardware unit which may be configured to distribute a set of tasks over a set of resources. In one embodiment, the load balancer 560 may be configured to transmit the visualized data to the AMM 550 to initiate management of the alarm function.

In an exemplary aspect, FIG. 5 is yet another extension of FIG. 3, wherein physical network functions (PNFs) 510 are applications that are running on the physical hardware/bare metal devices, and wherein EMS 520 is used to communicate the applications alarms to the AMM 550 (through the load balancer), and wherein the infrastructure/hardware alarms can be raised by the hardware resources 530.

In an example implementation, the storage unit 570 can be communicatively coupled with the AMM 550 such that the alarm management operations can be stored/logged along with timestamp and alarm parameters such as IoT network/component responsible for the alarm, type of alarm, severity of alarm, action taken post alarm, timestamps associated with such actions, among other like alarm attributes generated/processed by the AMM 550 in real-time. Storage unit 570 can further be enriched with event-based alarm information through one or more offline units such as offline enrichment module 575. AMM 550 can further be operatively coupled with a real-time enrichment module 580, and a Real-Time (RT) vs Near-Real-Time (NRT) selection module 585 that facilitates generation/transmission and receipt of alarm information/signals in RT or NRT depending on the context and situation. Based on the number of false triggers and/or alarm information generated by AMM 550 in real-time, alarm correlation information can be sent and synchronized between the selection module 585 and an alarm correlation learning and prediction engine 590. In an exemplary implementation, the term 'alarm correlation' may be defined as a method of combining multiple alarm notifications into a single notification to reduce an alarm flood. In one embodiment, the alarm correlation learning and prediction engine 490 may be created using any or a combination of an Artificial Intelligence (AI) and Machine Learning (ML) technique, to identify a priority for a corresponding one or more alarms which may be generated within the system 500. The engine 590 may rate the priority or the one or more alarm notifications based on a set of rules, a set of instructions which may be pre-defined.

Various embodiments of the present disclosure enable the system to provide an automated platform to detect and predict the faults in the hardware and the software architectures, thereby generating alarms in a single or multiple meter devices. Since the system also detects the faulty behaviors of the software architecture, the system is more reliable and efficient in terms of functionality.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A system comprising:
   an alarm management module (AMM) coupled with a processor, said processor causing the AMM to:
   receive a plurality of alarms raised by one or more applications running on a network function virtualization unit (NFVU) infrastructure, said NFVU infrastructure comprising a virtualization layer;
   enriching the plurality of alarms with NFVU infrastructure specific information based on a physical-and-virtual inventory associated with the NFVU infrastructure, said NFVU infrastructure specific information pertaining to hardware and virtual resources of the NFVU infrastructure that are involved in running said one or more applications, wherein the AMM is operatively coupled with an alarm correlation learning and prediction engine that identifies one or more actionable alarms, among the plurality of alarms, owing to which the plurality of alarms were raised or are resolvable, to reduce an alarm flood, wherein the one or more actionable alarms are identified by correlating relationships between the plurality of alarms; and transmit the enriched alarm information associated with the one or more actionable alarms to a computing device to enable an action to be taken based on the enriched alarm information in realtime.

2. The system of claim 1, wherein the processor causes the AMM to:

receive an infrastructure alarm pertaining to a hardware resource that forms part of the NFVU, said infrastructure alarm being associated with a failure of or a potential functional error of the hardware resource; and facilitate enrichment of the received infrastructure alarm information with application information, said application information pertaining to at least one application that is impacted by the hardware resource.

3. The system of claim 2, wherein the infrastructure alarm pertains to at least one of a hardware connectivity issue, hardware failure, network connectivity issue/failure, power issue, cooling issue, and a physical device functional error.

4. The system of claim 1, wherein the virtualization layer virtualizes hardware resources to form virtual resources, said virtual resources comprising at least one of a virtual computing unit, virtual storage unit, and a virtual network unit.

5. The system of claim 1, wherein the system further comprises a virtualized infrastructure manager (VIM) to manage the NFVU.

6. The system of claim 1, wherein the AMM receives the plurality of alarms through a load balancer.

7. The system of claim 6, wherein the load balancer is coupled with an alarm dictionary, based on which, from a directory of alarms, the load balancer identifies attributes associated with the received alarm, and accordingly load balances the alarm notifications sent to the AMM.

8. The system of claim 1, wherein the AMM is operatively coupled with a selection module that indicates whether to undertake real-time enrichment through a RT enrichment module or to undertake near-real-time enrichment through an offline enrichment module.

9. The system of claim 1, wherein the alarm correlation learning and prediction engine, over a period of time, learns performance threshold ranges for a plurality of hardware resources that form part of the NFVU infrastructure, and predicts when the ranges are expected to exceed, at which time instance, alarms are automatically raised by the NFVU infrastructure.

10. The system of claim 1, wherein the system further comprises one or more element management systems (EMSs) configured between the NFVU infrastructure and the AMM such that application alarm is generated by the EMS, and infrastructure alarm is generated by the NFVU infrastructure.

11. The system of claim 10, wherein the EMSs are operatively coupled with corresponding virtualization of network function (VNF) elements.

12. The system of claim 1, wherein the system further comprises one or more element management systems (EMSs) configured between a hardware resource infrastructure and the AMM such that application alarm is generated by the EMS, and infrastructure alarm is generated by the hardware resource infrastructure.

13. The system of claim 12, wherein the EMSs are operatively coupled with corresponding platform network function (PNF) elements.

14. A method comprising:

receiving, at an alarm management module (AMM), a plurality of alarms raised by one or more applications running on a network function virtualization unit (NFVU) infrastructure, said NFVU infrastructure comprising a virtualization layer;

enriching the plurality of alarms with NFVU infrastructure specific information based on a physical-and-virtual inventory associated with the NFVU infrastructure, said NFVU infrastructure specific information pertaining to hardware and virtual resources of the NFVU infrastructure that are involved in running said one or more applications, wherein the AMM is operatively coupled with an alarm correlation learning and prediction engine that identifies one or more actionable alarms, among the plurality of alarms, owing to which the plurality of alarms were raised or are resolvable, to reduce an alarm flood, wherein the one or more actionable alarms are identified by correlating relationships between the plurality of alarms; and transmitting the enriched alarm information associated with the one or more actionable alarms to a computing device to enable an action to be taken based on the enriched alarm information in realtime.

15. The method of claim 14, wherein the method further comprises:

receiving an infrastructure alarm pertaining to a hardware resource that forms part of the NFVU, said infrastructure alarm being associated with a failure of or a potential functional error of the hardware resource; and facilitating enrichment of the received infrastructure alarm information with application information, said application information pertaining to at least one application that is impacted by the hardware resource.

16. The method of claim 15, wherein the infrastructure alarm pertains to at least one of a hardware connectivity issue, hardware failure, network connectivity issue/failure, power issue, cooling issue, and a physical device functional error.

17. The method of claim 14, wherein the AMM is operatively coupled with a selection module that indicates whether to undertake real-time enrichment through a RT enrichment module or to undertake near-real-time enrichment through an offline enrichment module.

18. The method of claim 14, wherein the alarm correlation learning and prediction engine, over a period of time, learns performance threshold ranges for a plurality of hardware resources that form part of the NFVU infrastructure, and predicts when the ranges are expected to exceed, at which time instance, alarms are automatically raised by the NFVU infrastructure.

* * * * *